(12) United States Patent
Russo

(10) Patent No.: US 12,124,984 B2
(45) Date of Patent: Oct. 22, 2024

(54) APPARATUS FOR IDENTIFYING AN EXCESSIVE CARBON EMISSION VALUE AND A METHOD FOR ITS USE

(71) Applicant: PITT-OHIO, Pittsburgh, PA (US)

(72) Inventor: Justine A. Russo, Pittsburgh, PA (US)

(73) Assignee: PITT-OHIO EXPRESS, LLC, Pittsburgh, PA (US)

( * ) Notice: Subject to any disclaimer, the term of this patent is extended or adjusted under 35 U.S.C. 154(b) by 0 days.

(21) Appl. No.: 17/945,683

(22) Filed: Sep. 15, 2022

(65) Prior Publication Data

US 2024/0104476 A1  Mar. 28, 2024

(51) Int. Cl.
*G06Q 10/06* (2023.01)
*G06Q 10/0637* (2023.01)
*G06Q 30/00* (2023.01)
*G06Q 30/018* (2023.01)

(52) U.S. Cl.
CPC ..... *G06Q 10/06375* (2013.01); *G06Q 30/018* (2013.01)

(58) Field of Classification Search
None
See application file for complete search history.

(56) References Cited

U.S. PATENT DOCUMENTS

| | | | |
|---|---|---|---|
| 10,902,484 B1 * | 1/2021 | Pepere | G06Q 20/145 |
| 2008/0059390 A1 * | 3/2008 | Cox | H04N 21/44222 |
| | | | 706/12 |
| 2011/0055745 A1 * | 3/2011 | Penney | H04L 12/6418 |
| | | | 715/771 |
| 2011/0113430 A1 * | 5/2011 | Fuse | G06Q 10/06 |
| | | | 718/102 |
| 2011/0184784 A1 * | 7/2011 | Rudow | G06Q 10/0639 |
| | | | 701/29.6 |
| 2013/0338936 A1 * | 12/2013 | Hong | G06Q 10/04 |
| | | | 702/24 |

(Continued)

FOREIGN PATENT DOCUMENTS

| | | |
|---|---|---|
| CN | 113610471 A | 11/2021 |
| CN | 114088143 B | 4/2022 |
| CN | 114511145 A | 5/2022 |

*Primary Examiner* — Eric W Stamber
*Assistant Examiner* — Ashley Y Young
(74) *Attorney, Agent, or Firm* — Caldwell Intellectual Property Law

(57) ABSTRACT

An apparatus for identifying an excessive carbon emission value is disclosed. The apparatus may include at least a processor, and a memory communicatively connected to the at least a processor. The memory contains instructions configuring the at least a processor to receive a plurality of activity datum from at least a sensor, calculate a plurality of action carbon emission values, wherein calculating the plurality of action carbon emission values includes associating each of the plurality of activity datum to an action carbon emission value of the plurality of action carbon emission values and classifying each of the plurality of activity datum to an activity category of a plurality of activity categories. The memory further contains instructions configuring the at least a processor to identify an excessive carbon emission value from the plurality of action carbon emission values. A method for identifying an excessive carbon emission value is also disclosed.

20 Claims, 8 Drawing Sheets

(56) References Cited

U.S. PATENT DOCUMENTS

2020/0082289 A1\* 3/2020 Swierc ..................... H02J 3/14
2020/0372588 A1\* 11/2020 Shi ........................... G06N 3/08
2023/0013561 A1\* 1/2023 Sanchez ................ G06F 3/0482

\* cited by examiner

APPARATUS FOR IDENTIFYING AN EXCESSIVE CARBON EMISSION VALUE AND A METHOD FOR ITS USE

FIELD OF THE INVENTION

The present invention generally relates to the field of carbon efficiency. In particular, the present invention is directed to an apparatus for identifying an excessive carbon emission value and a method for its use.

BACKGROUND

Modern manufacturers create and transport many products that have various impacts on the environment, mainly carbon emissions. The carbon emissions form the creation and transport of these products need to be tracked and the providers may allocate resources for the reduction of the carbon emissions. Current systems for tracking carbon emission are not time efficient and are prone to human error.

SUMMARY OF THE DISCLOSURE

In an aspect, an apparatus for identifying an excessive carbon emission value, wherein the apparatus includes at least a processor and a memory communicatively connected to the at least a processor, the memory containing instructions configuring the at least a processor to receive a plurality of activity datum from at least a sensor. The memory containing instructions further configuring the at least a processor to calculate a plurality of action carbon emission values, wherein calculating the plurality of action carbon emission values includes associating each of the plurality of activity datum to an action carbon emission value of the plurality of action carbon emission values and classifying each of the plurality of activity datum to an activity category of a plurality of activity categories. The memory containing instructions further configuring the at least a processor to identify an excessive carbon emission value from the plurality of action carbon emission values.

In another aspect, a method for identifying an excessive carbon emission value, wherein the method includes receiving, using at least a processor, a plurality of activity datum from at least a sensor. The method further includes calculating, using at least the processor, a plurality of action carbon emission values, wherein calculating the plurality of action carbon emission values includes associating each of the plurality of activity datum to an action carbon emission value of the plurality of action carbon emission values and classifying each of the plurality of activity datum to an activity category of a plurality of activity categories. The method further includes identifying, using the at least a processor, an excessive carbon emission value from the plurality of action carbon emission values.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to an apparatus for identifying an excessive carbon emission value is disclosed. The apparatus may comprise at least a processor, and a memory communicatively connected to the at least a processor. The memory contains instructions configuring the at least a processor to receive the activity datum from at least a sensor. The memory further instructs the processor to calculate a plurality of action carbon emission values. Calculating a plurality of action carbon emission values may comprise associating the activity datum to an activity category of a plurality of activity categories. Calculating the plurality of action carbon emission values may further comprise classifying each activity category of the plurality of activity categories to a carbon emission value. The memory then instructs the processor to identify the excessive carbon emission value as a function of the plurality of action carbon emission values and the excessive carbon emission classifier.

Figure 1:
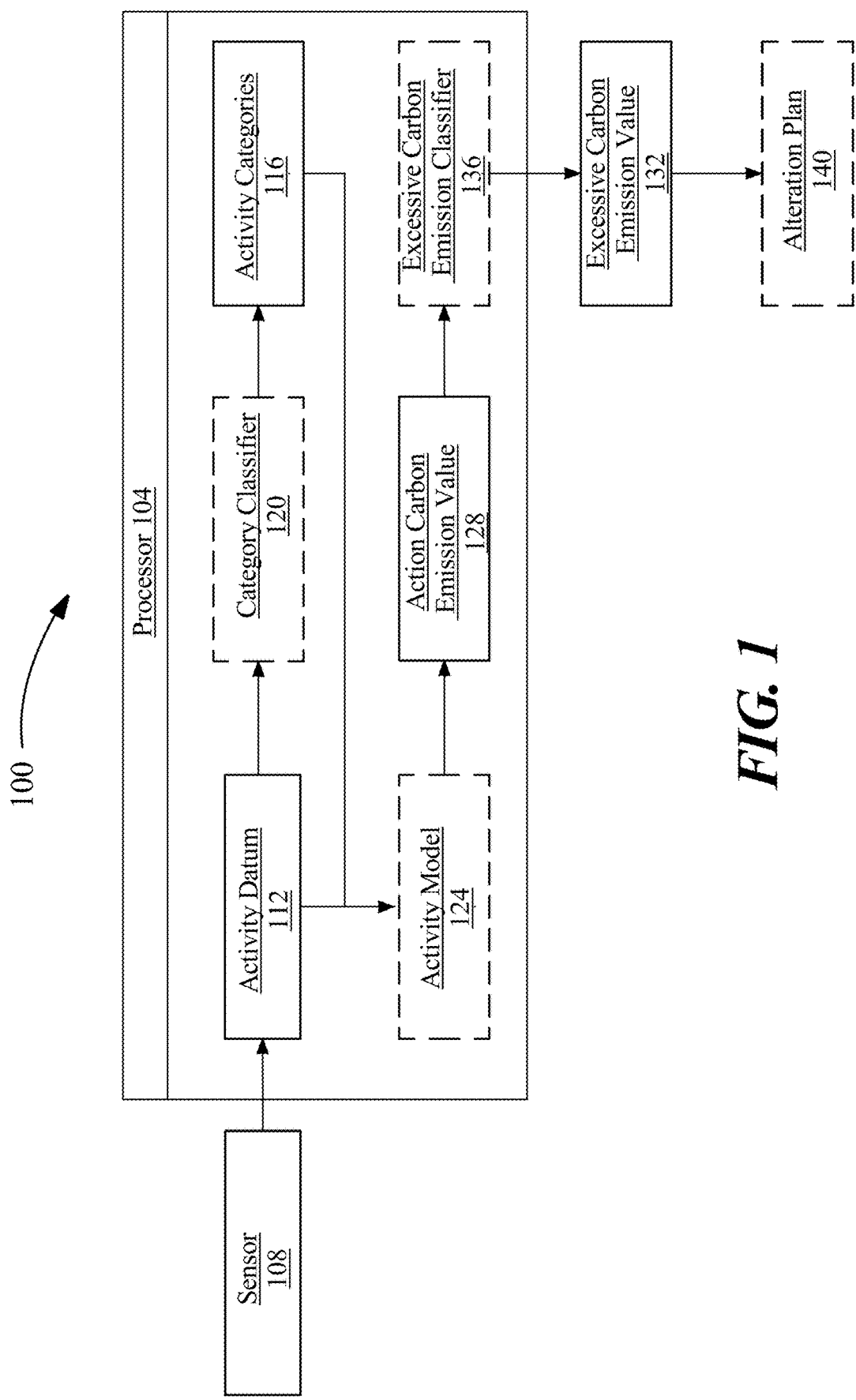
FIG. 1 is a block diagram of an exemplary embodiment of an apparatus for identifying an excessive carbon emission value.

Referring now to FIG. 1, an exemplary embodiment of an apparatus 100 for identifying an excessive carbon emission value is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, As used in this disclosure, "communicatively connected" means connected by way of a connection, attachment, or linkage between two or more related which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be communicatively connected to one or more sensors 108. As used in this disclosure, a "sensor" is a device that is configured to detect a phenomenon and transmit information related to the detection of the phenomenon. For example, in some cases a sensor may transduce a detected phenomenon, such as without limitation, current, speed, direction, force, torque, moisture, temperature, pressure, geographic location, resistance, touch sensors, fuel gage, electricity usage, carbon emissions, one or more cameras, and the like, into a sensed signal. Sensor 108 may include one or more sensors which may be the same, similar, or different. Sensor 108 may include one or more sensor suites with sensors in each sensor suite being the same, similar, or different. A sensor 108 may be located within a user device. A user device includes a tablet, laptop, smartphone, and the like. A sensor 108 may also be locate on the interior/exterior of a transport vehicle.

With continued reference to FIG. 1, a "transport vehicle" as used in this disclosure is a machine capable of moving one or more objects between one or more locations. In some embodiments, a transport vehicle may include, but is not limited to, a freight carrier, a truck, a car, a boat, a plane, a motorcycle, and the like. A transport vehicle may be configured to operate through, but is not limited to, air, land, sea, and the like. A transport vehicle may be configured to engage in one or more steps of a transport. In some embodiments, a transport vehicle may engage in pickup, delivery, and/or line haul operations. In some embodiments, a transport vehicle may include, but is not limited to, less than Truckload ("LTL") and/or Full Truckload ("FTL") freight delivery.

Still referring to FIG. 1, at least a sensor 108 may include a plurality of sensors. In an embodiment, sensor 108 may include a temperature sensor, accelerometer, gyro meter, pressure sensor, GPS, speed gauge, voltage sensors, current sensors, ohm sensors, touch sensors, fuel gauge, electricity usage meter, gas meter, cameras, multimeters, rental sensor, facial recognition, a carbon emissions sensor, image sensor, scale, materials sensor, and the like. In an embodiment, a sensor may be used measure carbon emission.

Still referring to FIG. 1, A sensor 108 is configured to detect may be an activity datum 112. As used in the current disclosure, a "activity datum" is an element of datum regarding activities of the user regarding the creation, transportation, or delivery of goods and services. Activity datum 112 may include transportation data, operator data, and manufacturing datum, respectively. As used in the current disclosures, "transportation data" is activity datum 112 related movement of goods, service, and/or equipment by a transport vehicle. This may include moving goods, services, and or equipment from a first location to a second location. The movement of goods may occur via ground, water, air transport, or any combination thereof. Examples of transportation data may the medium of transportation, duration of transportation, distance of transportation, transport routes, fuel usage during transport, and the like. As used in the current disclosures, a "manufacturing datum" is activity datum 112 that is related the manufacturing of goods or products. The manufacture of a good may include the creation, assembly, and packaging of a good or product. In some embodiments, activity datum may include datum regarding different elements of the delivery of a product, including, as non-limiting examples, the loading of a transport vehicle, the idling of a transport vehicle, the transport of the products using a transport vehicle, the unloading of the transport vehicle, and the like. For example, manufacturing datum may include materials used to make a product, number of materials used to make a product, product assembly techniques, product packaging used, equipment used to produce a product, weights of pay-load, packing specifications, traffic data, weather data, and the like. As used in the current disclosures, a "operator data" is activity datum 112 that is related the actions of the of an operator. An operator may include any person who aids in the creation, manufacture, transportation, and/or delivery of goods and services. Examples of operators may include product manufacturing workers, product transportation work, product testers, and the like. Examples of operator data may comprise the number of man-hours used create a product, the speed at which a product is transported, the efficiency of the operator.

With continued reference to FIG. 1, processor 104 is configured to receive an activity datum 112 from the at least a sensor 108. In some embodiments, processor 104 may receive a plurality of activity datum 112 from the at least a sensor 108. In some embodiments, processor 104 may receive activity datum 112 from the sensor 108 using wired communication. In some embodiments, processor 104 may receive activity datum 112 from the sensor 108 using wireless communication, such as, as non-limiting examples, WiFi, Bluetooth, 3G, 4G, LTE, 5G, cellular data, cellular networks, NFC, radio, and the like.

With continued reference to FIG. 1, processor 104 may be configured to classify an activity datum 112 into a plurality of activity categories 116. As used in the current disclosure, "activity categories" are classes to which an activity represented by an activity datum 112 can belong to. Examples of activity categories 116 may include but are not limited to transportation of product, transportation of raw materials, manufacturing of the product, assembly of product, use of the product, packaging of the product, loading of a product onto a transport vehicle, unloading of a product out of a transport vehicle, idling of a transport vehicle and the like. Activity categories 116 may be broken down into subcategories such as ground transportation of product or raw materials, freight transportation of product or raw materials, air transportation of product or raw materials, various processes used manufacturing of the product, machinery used to manufacture the product, and the like. Activity datum 112 may be classified into a plurality of activity categories 116 as a function of the type of activity datum 112. In a non-limiting example, activity datum 112 that reflects miles traveled by the product may be categorized into transportation of product. In another non-limiting example, activity datum 112 that reflects packaging of a good or product may be classified as the manufacture of the product. In some embodiments, processor 104 may classify activity datum 112 into an activity category 116 as a function of the location of sensor 108. As a non-limiting example, if sensor 108 is located in a packaging center, then activity datum 112 may be classified into an activity category 116 having to do with packaging of a product. As another non-limiting example, if sensor 108 is located in a distribution center, then activity datum 112 may be classified into an activity category 116 having to do with the loading of a transport vehicle. A person of ordinary skill in the art, after having reviewed the entirety of this disclosure, would appreciate that there are a variety of inferences that can be drawn from the location of sensor 108 with respect to classifying activity datum 112. In some embodiments, activity datum 112 may be classified to an activity category using metadata or other data that is received regarding activity datum 112. For example, metadata or other data may indicate that a particular activity datum 112 is related to the unloading of a truck; thus, this activity datum 112 may be classified to an activity category 116 relating to the unloading of a transport vehicle. In some embodiments, activity datum 112 may be classified to an activity category 116 using a category classifier 120. Category classifier is discussed further below.

Still referring to FIG. 1., processor 104 may calculate a category carbon emission value. As used in the current disclosure, a "category carbon emission value" is the total amount of greenhouse gases (including carbon dioxide and methane) that are generated by the activities underlying all of activity data 112 in an activity category 116. Thus, in some embodiments, each activity category 116 may be associated with a corresponding category carbon emission value. Category carbon emission value may be calculated using the carbon emission values discussed below.

With continued reference to FIG. 1, processor 104 is configured to associate activity datum 112 with an action carbon emission value 128. This may optionally be done using activity model 124 as discussed further below. In some embodiments, action carbon emission value 128 be generated as a function of fuel consumption data. As used in the current disclosure, "fuel consumption data" is the amount of fuel consumed while engaged in activities included in an activity datum. This may include the fuel consumed during any activity included in transport data, manufacturing data, or operator data. Fuel may include, but is not limited to, gasoline, diesel, propane, liquefied natural gas, and/or other fuel types. In some embodiments, a transport vehicle may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, bio-fuel, vegetable oil, propane, and the like. In the instance of alternative fuel, an energy conversion factor may be included. In some embodiments, an energy conversion factor may include, but is not limited to, gallons to electric equivalent for a hybrid or electric transport vehicle. Greenhouse gas data may be consistent with any greenhouse gas data disclosed in U.S. patent application Ser. No. 17/749,535, filed on May 20, 2022, and entitled "SYSTEM AND METHOD FOR GREENHOUSE GAS TRACKING," the entirety of which is incorporated by reference herein in its entirety.

Still referring to FIG. 1, in some embodiments, action carbon emission value 128 may be calculated from fuel consumption data, which may include the amount of fuel consumed over a period of time while engaging in an activity included within activity datum 112. As a non-limiting example, the period of time may be the last 3 days, 1 week, 3 months, 2 years, 1 day, 3 hours and the like. In some embodiments, the period of time may be the period of time it took to complete a particular activity included within activity datum 112. As a non-limiting example, if a activity took 5 hours to complete, the period of time may correspond to those 5 hours. In some embodiments, the activity may be an activity that is to be done or has been done by an operator. In some embodiments, the activity may be a job for an operator, which includes moving one or more objects from one location to another. In some embodiments, the task may be a job for an operator, which includes moving one or more objects from one location to another using a transport vehicle. In some embodiments, the task may be a job for an operator to do using a transport vehicle.

Still referring to FIG. 1, in some embodiments, action carbon emission value 128 may be calculated from mileage data. For the purposes of this disclosure, "mileage data" is data pertaining to a number of miles traversed by a transport vehicle. Mileage data may be measured in miles, kilometers, feet, yards, furlongs, leagues, and/or any other suitable distance unit. Mileage data may be measured over a period of time. The period of time may be, as a non-limiting example, the career of an operator. As another non-limiting example, the period of time may be the last 3 days, 1 week, 3 months, 2 years, and the like. As another non-limiting example, the period of time may be the period of time it took to complete a particular activity. As a non-limiting example, if an activity took 5 hours to complete, the period of time may correspond to those 5 hours. In some embodiments, other types of data may be used to calculate carbon emission datum such as type of fuel, idling time, traffic data, and the like. A person of ordinary skill in the art would appreciate, after having reviewed the entirety of this disclosure, that a variety of data could be used in addition to or in place of the data mentioned here in order to calculate the carbon emission datum.

Still referring to FIG. 1, action carbon emission value 128 may be calculated as a function of the amount of fuel that is consumed. In a non-limiting example, one liter of gasoline, when used as a fuel, produces 2.32 kg (about 1300 liters or 1.3 cubic meters) of carbon dioxide, a greenhouse gas. One US gallon produces 19.4 lb. (1,291.5 gallons or 172.65 cubic feet). Action carbon emission value 128 may also be generated as a function of energy generated from the fuel. In a non-limiting example, the mass of carbon dioxide that is released when one MJ of energy is released from fuel can be estimated to a good approximation. For the chemical formula of diesel we use as an approximation $C_nH_{2n}$. Note that diesel is a mixture of different molecules. As carbon has a molar mass of 12 g/mol and hydrogen (atomic!) has a molar mass of about 1 g/mol, so the fraction by weight of carbon in diesel is roughly 12/14. The reaction of diesel combustion is given by:

$$2C_nH_{2n} + 3nO_2 \rightleftharpoons 2nCO_2 + 2nH_2O$$

Carbon dioxide has a molar mass of 44 g/mol as it consists of 2 atoms of oxygen (16 g/mol) and 1 atom of carbon (12 g/mol). So 12 g of carbon yield 44 g of Carbon dioxide. Diesel has an energy content of 42.6 MJ per kg, or 23.47 gram of Diesel contain 1 MJ of energy. Putting everything together the mass of carbon dioxide that is produced by releasing 1 MJ of energy from diesel fuel can be calculated as:

$$23.47 \, g\frac{Diesel}{MJ} * \frac{12}{14} * \frac{44}{12} = 74 \text{ g (Carbon Dioxide)}/MJ$$

For gasoline, with 22 g/MJ and a ratio of carbon to hydrogen atoms of about 6 to 14, the estimated value of carbon emission for 1 MJ of energy is:

$$22 \, g\frac{gasoline}{MJ} * \frac{6*12}{6*12 + 14*1} * \frac{44}{12} = 67.5 \text{ g (Carbon Dioxide)}/MJ$$

Mass of Carbon Dioxide Emitted Per Quantity of Energy for Various Fuels

| Fuel name | $CO_2$ emitted (lbs./$10^6$ Btu) | $CO_2$ emitted (g/MJ) | $CO_2$ emitted (g/kWh) |
|---|---|---|---|
| Natural gas | 117 | 50.30 | 181.08 |
| Liquefied petroleum gas | 139 | 59.76 | 215.14 |
| Propane | 139 | 59.76 | 215.14 |

Mass of Carbon Dioxide Emitted Per Quantity of Energy for Various Fuels

| Fuel name | $CO_2$ emitted (lbs./$10^6$ Btu) | $CO_2$ emitted (g/MJ) | $CO_2$ emitted (g/kWh) |
|---|---|---|---|
| Aviation gasoline | 153 | 65.78 | 236.81 |
| Automobile gasoline | 156 | 67.07 | 241.45 |
| Kerosene | 159 | 68.36 | 246.10 |
| Fuel oil | 161 | 69.22 | 249.19 |
| Tires/tire derived fuel | 189 | 81.26 | 292.54 |
| Wood and wood waste | 195 | 83.83 | 301.79 |
| Coal (bituminous) | 205 | 88.13 | 317.27 |
| Coal (sub-bituminous) | 213 | 91.57 | 329.65 |
| Coal (lignite) | 215 | 92.43 | 332.75 |
| Petroleum coke | 225 | 96.73 | 348.23 |
| Coal (anthracite) | 227 | 97.59 | 351.32 |

With continued reference to FIG. 1, in some embodiments, activity model 124 may also be used to associate activity datum 112 to an action carbon emission value 128. Activity model 124 may receive activity datum 112 as input. In some embodiments, activity model 124 may additionally receive an activity category 116 associated with activity datum 112 as input. Activity model 124 may be configured to output an action carbon emission value 128 for activity datum 112. Activity model 124 may be trained using activity training data. Activity training data may include a plurality of data entries containing a plurality of inputs that are correlated to a plurality of outputs for training a processor by a machine-learning process to associate a user's activity datum 112 to an action carbon emission value 128. Activity training data may be received from a database, such as a training data database. In some embodiments, activity training data may comprise data from previous uses of activity model 124. In these embodiments, for example, activity training data may be received from a database, such as carbon emission database 300. Activity training data may include, as the plurality of inputs, examples of activity datum 112. In some embodiments, activity training data may also include activity categories 116 associated with one or more of the activity datum 112. In some embodiments, activity training data may include, as the plurality of outputs, an action carbon emission value for one or more of the activity datum 112.

Still referring to FIG. 1, in some embodiments, activity model 124 may be trained as a classifier. Activity model 124 may be trained to classify an activity datum 112 to a window of action carbon emission values 128. For example, the window of action carbon emission values 128 may be a range of carbon emission values typically associated with a similar activity datum. In some embodiments, activity model 124 may associate activity datum 112 with an action carbon emission value 128 by taking an midpoint of the window of carbon emission values.

With continued reference to FIG. 1, classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier, such as activity model 124 or category classifier 120, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n}a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some embodiments, processor 104 may be configured to classify the activity datum 112 to activity category 116 using a category classifier 120. As used in the current disclosure, a "category classifier" is a machine-learning model that sorts inputs into categories or bins of data, outputting the categories or bins of data and/or labels associated therewith. Category classifier may be consistent with the classifier described below in FIG. 2. Inputs to the category classifier 120 may include, as a non-limiting example, activity datum 112 and/or action carbon emission values 128. In some embodiments, inputs to the category classifier may also include fuel consumption data, transportation data, manufacturing data, operator data, any combination thereof, or the like. The output of category classifier 120 may include activity categories 116. The output of category classifier 120 may include an activity category 116 associated with an activity datum 112. Category classifier 120 may be trained as described with reference to FIG. 2. In some embodiments, category classifier 120 may be trained using category training data, wherein the category training data comprises a plurality of inputs correlated to a plurality of outputs. In some embodiments, the plurality of inputs of category training data may include activity data. In some embodiments, the plurality of inputs may also include action carbon emission values associated with those activity datums. In some embodiments, the plurality of outputs of category training data may include labels of activity categories correlated to the activity data. The category training data may include data collected from previous uses of category classifier 120. The category training data may be received from a database such as a training data database or carbon emission database 300. In some embodiments, the labels of activity categories may be manually generated.

With continued reference to FIG. 1., a processor 104 may calculate an action carbon emission value 128 using a lookup table. A "lookup table," for the purposes of this disclosure, is an array of data that maps input values to output values. A lookup table may be used to replace a runtime computation with an array indexing operation. In another non limiting example, a carbon emission look up table may be able to relate activity datum 112 to an action carbon emission value 128. A carbon emission lookup table may relate fuel consumption data or any other data contained in activity datum 112 to action carbon emission datum 128. Processor 104 may be configured to "lookup" one or more fuel activity datums 112, mileage datums, fuel consumption datums, manufacturer actions, and the like, in order to find a corresponding action carbon emission value 128.

With continued reference to FIG. 1., processor 104 may be configured to determine an excessive carbon emission value 132 from a plurality of action carbon emission values 128. As used in the current disclosure, "excessive carbon emission value" is an action carbon emission value 128 that is excessive in its carbon emission for the given action. A determination of whether an action carbon emission value 128 is excessive may be done by comparing an action carbon emission value 128 to the national average for similar actions. In a non-limiting example, action carbon emission value 128 for transporting goods may be 215 grams of $CO_2$ per ton per mile while the national average is 161 grams of $CO_2$ per ton per mile the action carbon emission value 128 of 215 grams of $CO_2$ may be considered excessive. In another embodiment, a determination if an action carbon emission value 128 is an excessive carbon emission value 132 may be decided by comparing it to the historical action carbon emission values 128. In another non-limiting example, from 2015-2019 a manufacturer had an action carbon emission value 128 of 197 grams of $CO_2$ per unit for a product that was manufactured, subsequently in 2021 the manufacturer had an action carbon emission value 128 of 286 grams of $CO_2$ per unit for the same product that was manufactured. This sharp spike in $CO_2$ emissions per unit may cause the higher action carbon emission value 128 to be considered an excessive carbon emission value 132.

With continued reference to FIG. 1, in some embodiments, processor 104 may determine an excessive carbon emission value by calculating the highest action carbon emission value 128 within each activity category 116. In some embodiments, the highest action carbon emission value 128 within each activity category 116 may be deemed to be an excessive carbon emission value 132. In some embodiments, the highest X % of action carbon emission values 128 within each activity category 116 may be deemed to be an excessive carbon emission values 132. As non-limiting examples, X % may be 1%, 5%, 10%, 20%, 25%, and the like. In some embodiments, the highest action carbon emission value 128 from a particular time period within each activity category 116 may be deemed to be an excessive carbon emission value 132. In some embodiments, the particular time period may be 1 day, 1 week, 1 month, 3 months, a fiscal quarter, a year/fiscal year, and the like. In some embodiments, the highest X % of action carbon emission values 128 from a particular time period within each activity category 116 may be deemed to be an excessive carbon emission values 132. As non-limiting examples, X % may be 1%, 5%, 10%, 20%, 25%, and the like. In some embodiments, excessive carbon emission value 132 may be the largest action carbon emission value among all of activity categories. In some embodiments, excessive carbon emission value 132 may be the largest action carbon emission value among a selected subset of activity categories. In some embodiments the selected subset of activity categories may be user selected.

With continued reference to FIG. 1, processor 104 may be configured to identify an excessive carbon emission value 132 from a plurality of action carbon emission values 128 using an excessive carbon emission classifier 136. As used in the current disclosure, an "excessive carbon emission classifier" is a machine-learning model that sorts inputs into categories or bins of data, outputting the categories or bins of data and/or labels associated therewith. Excessive carbon emission classifier 136 may be consistent with the classifier described below in FIG. 2. Inputs to the to the excessive carbon emission classifier 136 may include, as a non-limiting example, activity datum 112, action carbon emission values 124, or activity categories 116. The output to the excessive carbon emission classifier may be an excessive carbon emission value 132 or a determination as to whether an activity datum 112 qualifies as an excessive carbon emission value 132. Excessive carbon emission training data may be a plurality of data entries containing a plurality of inputs that are correlated to a plurality of outputs for training a processor by a machine-learning process to classify some action carbon emission values 128 as an excessive carbon emission value 132. Excessive carbon emission training data may be received from a database, such as a training data database. Excessive carbon emission training data may include, as the plurality of inputs, a plurality of action carbon emission values. In some embodiments, the plurality of inputs of excessive carbon emission training data may also include activity categories 116. In some embodiments, the excessive carbon emission training data may include, as the plurality of outputs, a classification as to whether an action carbon emission value of the plurality of action carbon emission values is an excessive carbon emission value. Excessive carbon emission training data may be generated from any past action carbon emission values 128 and/or past excessive carbon emission values 132. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, a classifier, such as excessive carbon emission classifier 136, may be implemented as a fuzzy inferencing system. As used in the current disclosure, a "fuzzy inference" is a method that interprets the values in the input vector (i.e., excessive carbon emission value 132 and action carbon emission value 128.) and, based on a set of rules, assigns values to the output vector. A fuzzy set may also be used to show degree of match between fuzzy sets may be used to rank one resource against another. For instance, if both excessive carbon emission value 132 and action carbon emission value 128 have fuzzy sets, action carbon emission value 128 may be classified as an excessive carbon emission value 132 by having a degree of overlap exceeding a predictive threshold, processor 104 may further rank the two resources by ranking a resource having a higher degree of match more highly than a resource having a lower degree of match.

Still referring to FIG. 1, an action carbon emission ranking may be generated as a function of an action carbon emission value 128. As used in the current disclosure, an "Action Carbon Emission Ranking" is a ranking of activities based on the amount of carbon emissions that they produce. In some embodiments, action carbon emission ranking may include a ranked list of each activity datum 112 in a given activity category 116 ranked in ascending or descending order by action carbon emission value 128. In some embodiments, action carbon emission ranking may include a ranked list for each activity category 116 of activity datum 112 based on action carbon emission value. In some embodiments, action carbon emission ranking may include a ranked list for a subset of activity categories 116 of activity datum 112 based on action carbon emission value. Subset of activity categories may be selected by user input.

With continued reference to FIG. 1, processor 104 may be configured to generate an alteration plan 140 as a function of the excessive carbon emission value 132. As used in the current disclosure, an "alteration plan" is a set of instructions configured to manipulate an activity associated with an excessive carbon emission value 132 in a manner to decrease its carbon emissions. An alteration plan 140 may be generated as a function of the action carbon emission ranking or excessive carbon emission value 132. In an embodiment, the goal of an alternation plan 136 is to reduce the excessive carbon emission value 132 to an acceptable carbon emission value. An acceptable carbon emission value for a given action may be generated as a function of the historical action carbon emission value or by a national average for carbon emissions for similar activities. An alteration plan 140 may accomplish a reduction of carbon emissions by suggesting a one or more carbon reducing policies for a manufacturer to put in place. For example, a suggestion may include modifying an activity included within activity datum 112 for the purpose of reducing reduce carbon emissions. Another suggestion may include a change to more carbon friendly raw materials or packaging. The suggestion may also include a change to the use of more carbon friendly processes during the assembly and creation of the product. An alteration plan 140 may also comprise a suggestion of ways to make the transportation of goods and services more efficient in terms of carbon emissions. This may include changing the medium of transportation to a more carbon friendly route. This may also include suggestions to shorten the duration or distance of transportation of goods and services. The alteration plan 140 may follow state and federal laws regarding carbon emissions. For example, certain states may limit the amount of carbon emissions that may be produced by a vehicle and/or factory. The alteration plan 140 may be generated with machine learning. That is, a machine learning model may require carbon emission value activity as an input and then output an alteration plan 140 as an output.

With continued reference to FIG. 1, activity datum 112, fuel consumption data, transportation data, manufacturing data, operator data, action carbon emission value 128, action carbon emission ranking, excessive carbon emission value 132, alteration plan 140, and the like may be displayed using a graphical user interface (GUI). As used in the current disclosure, a "graphical user interface" may include a plurality of lines, images, symbols. GUI may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time. In some embodiments, a GUI may display an alteration plan 140 as a set of instructions to the user. An alteration plan 140 may be displayed step by step instructions to the user. In some embodiments, the user may be asked to select one alteration plan 140 of a plurality of alteration plans 140. The plurality of alteration plans 140 may each refer to a different activity or action of the manufacturer. The GUI may additionally display action carbon emission values 128 associated with each alteration plan 140.

Figure 2:
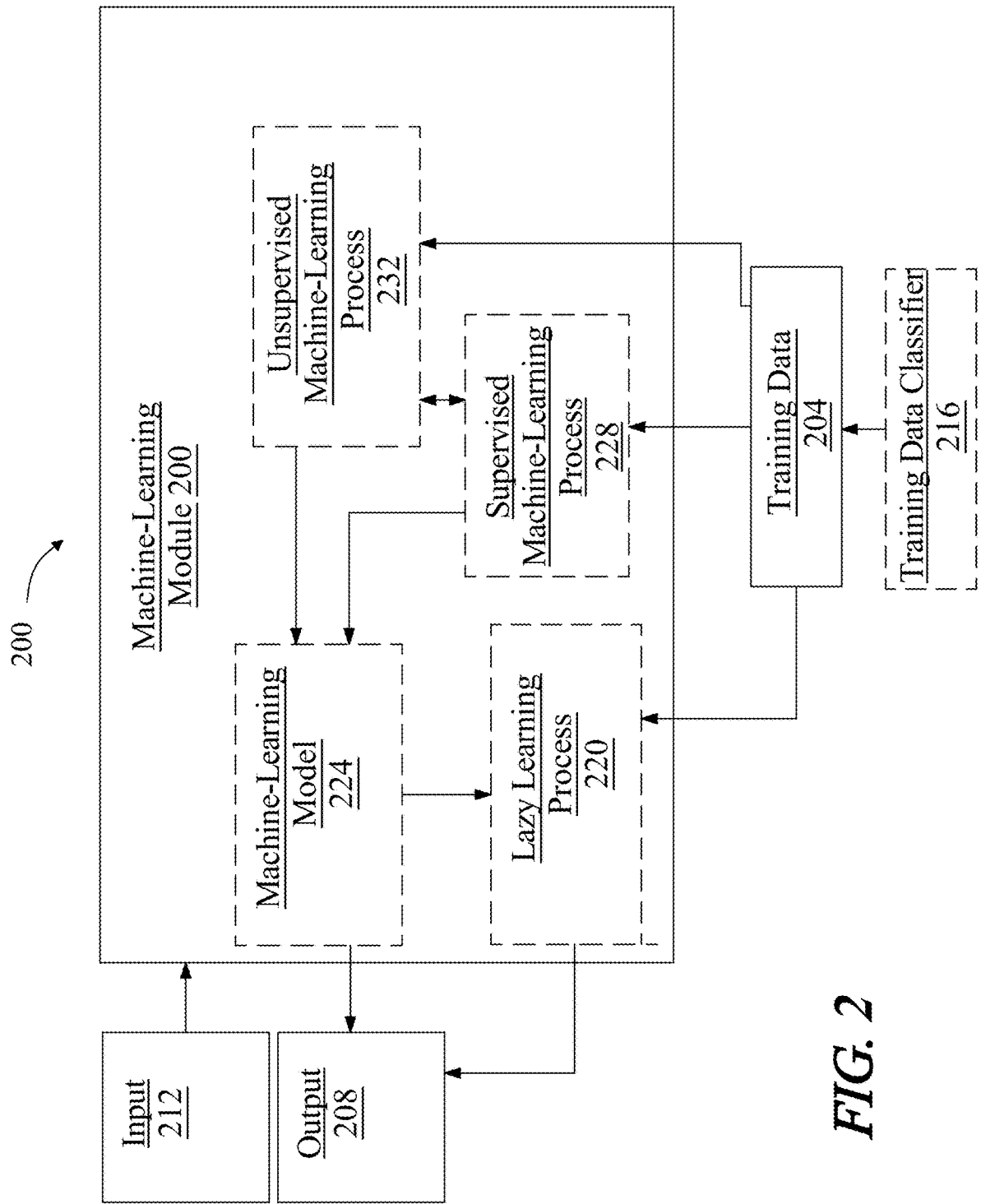
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a activity datum 112 or action carbon emission value 128 as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

For example, and still referring to FIG. 2, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Figure 3:
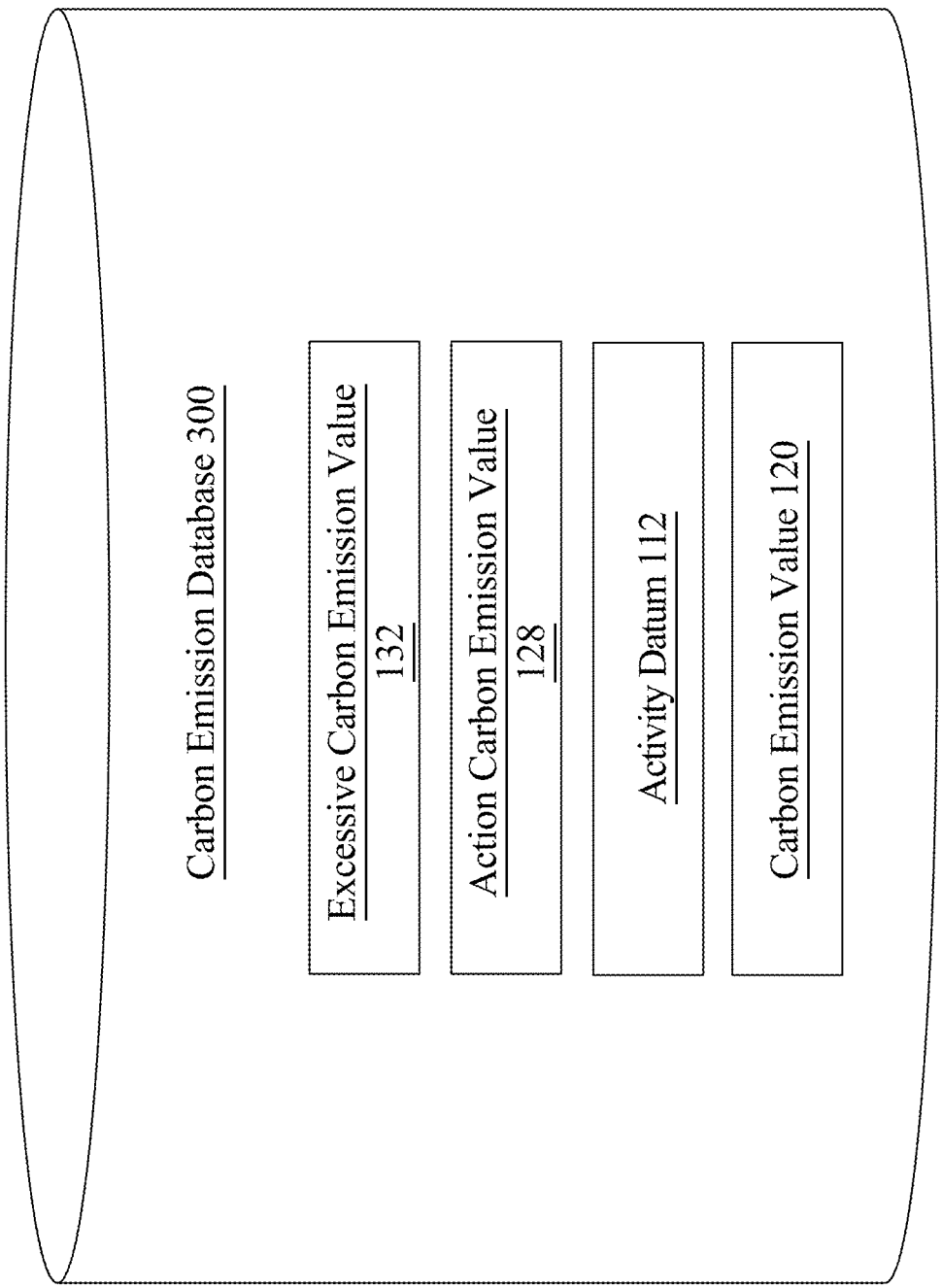
FIG. 3 is a block diagram of an exemplary embodiment of a carbon emission database.

Now referring to FIG. 3, an exemplary carbon emission database 300 is illustrated by way of block diagram. In an embodiment, activity datum 112, a plurality of activity categories 116, fuel consumption data, transportation data, manufacturing data, operator data, action carbon emission value 128, action carbon emission ranking, excessive carbon emission value 132, alteration plan 140, and/or the like may be stored in a carbon emission database 300 (also referred to as "database"). Processor 104 may be communicatively connected with carbon emission database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Carbon emission database 300 may be implemented, without limitation, as a relational database, a key-value retrieval database such as a NOSQL database, or any other format or structure for use as a database that a person skilled in the art would recognize as suitable upon review of the entirety of this disclosure. Carbon emission database 300 may alternatively or additionally be implemented using a distributed data storage protocol and/or data structure, such as a distributed hash table or the like. Carbon emission database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
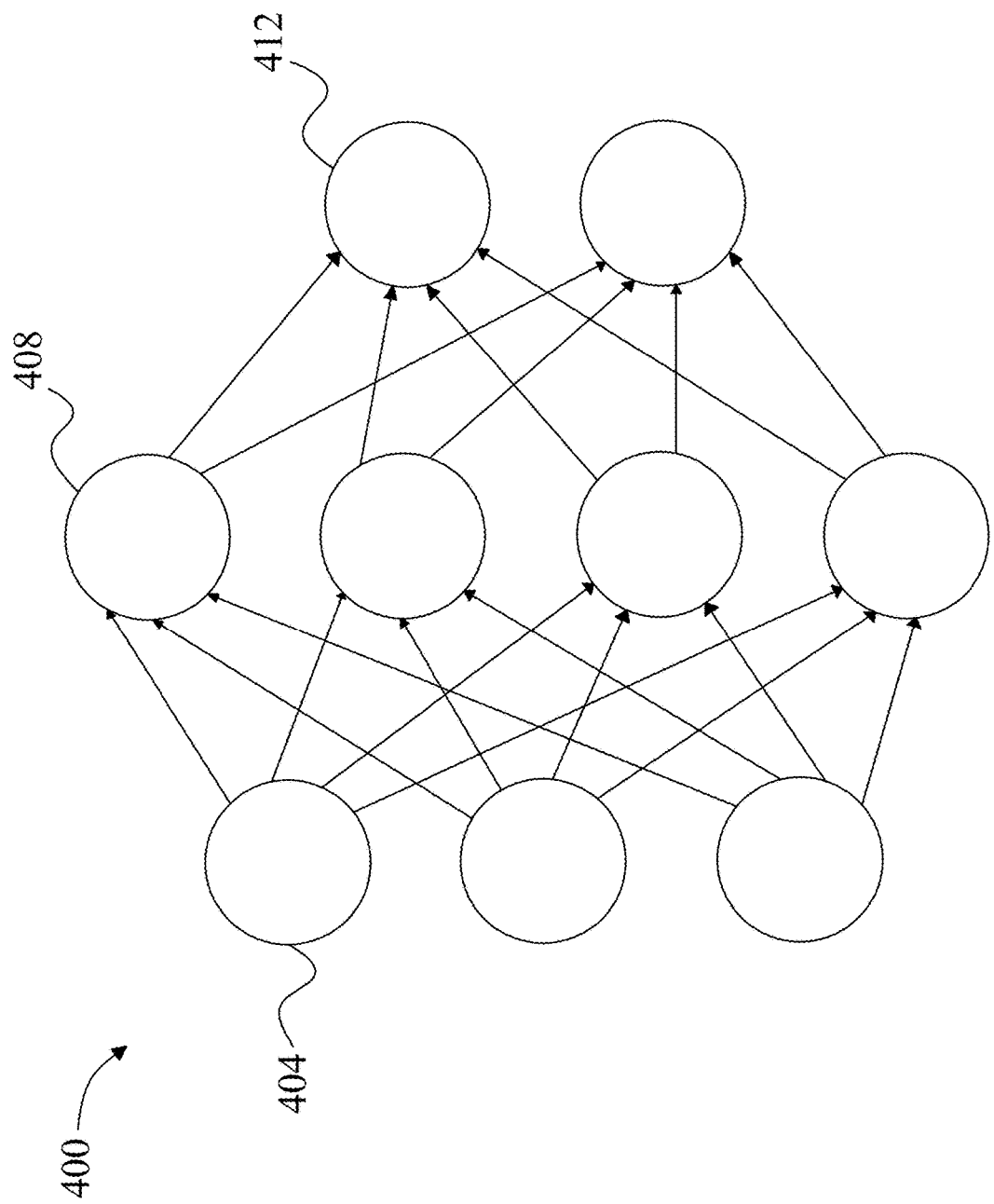
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
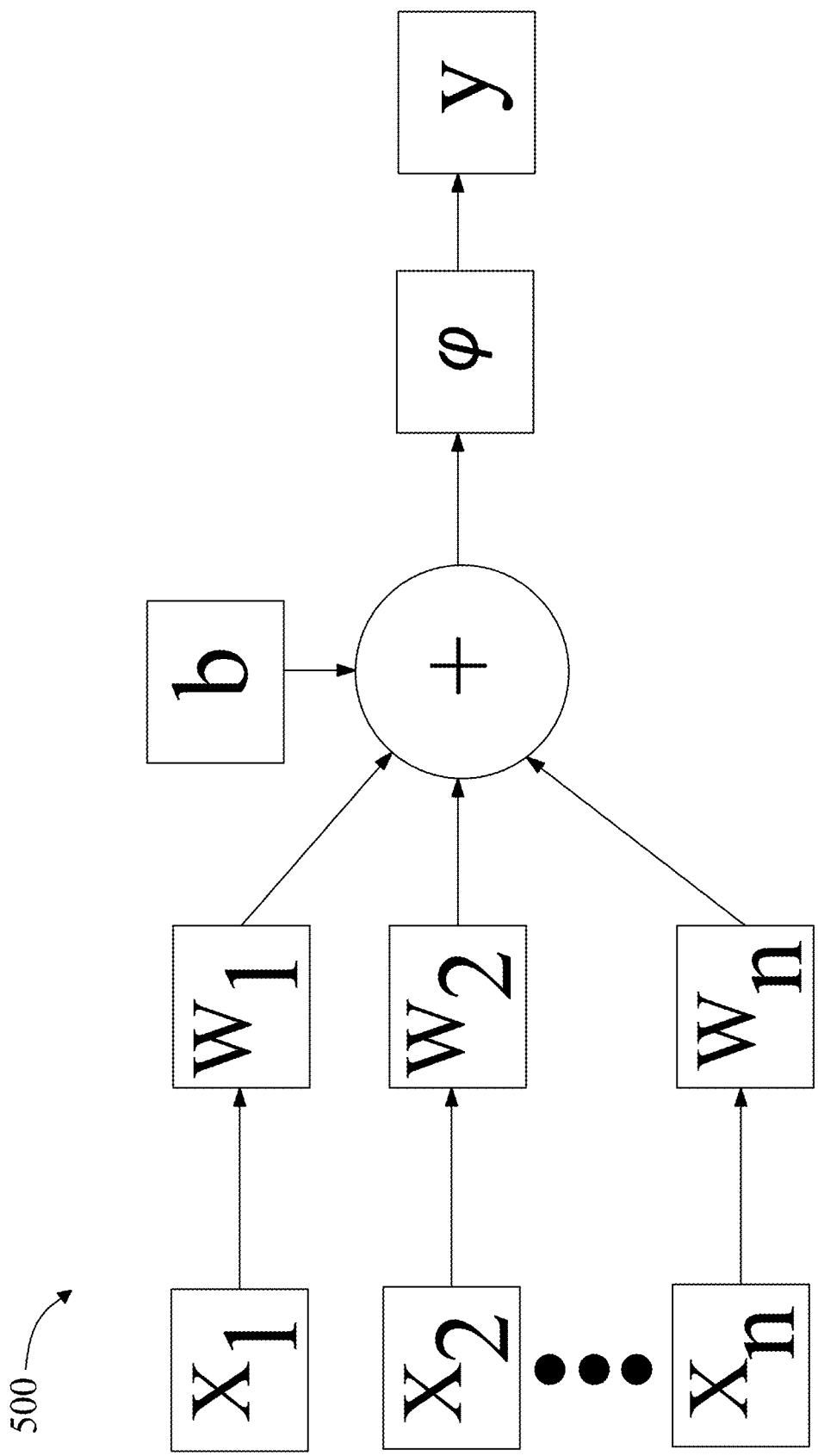
FIG. 5 is a diagram of an exemplary embodiment of a node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
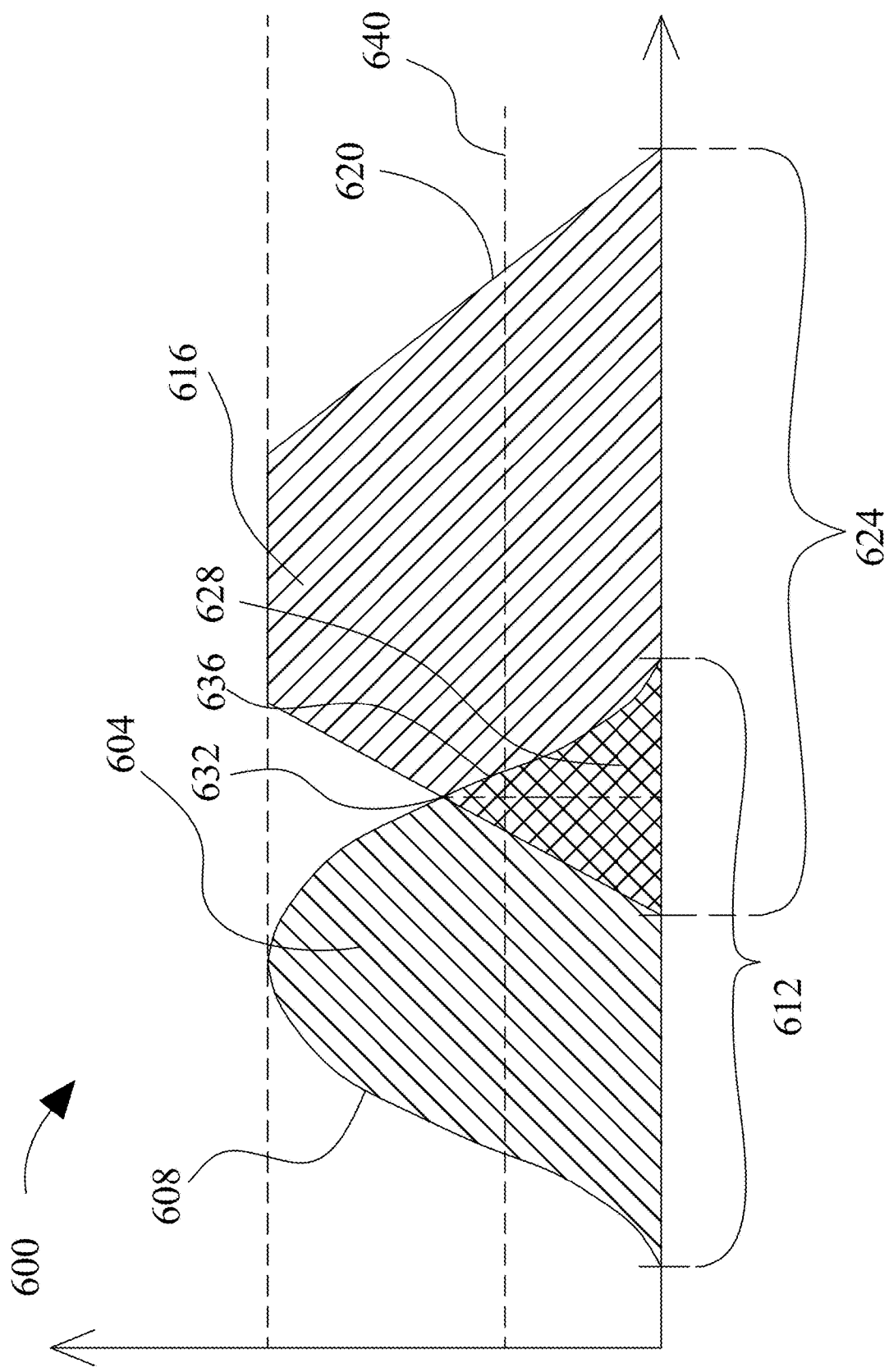
FIG. 6 is a graph illustrating an exemplary relationship between fuzzy sets.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent user action carbon emission value 128, and/or excessive carbon emission value 132 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input and/or action carbon emission value 128, and/or excessive carbon emission value 132. For instance, an acceptance variable may represent a first measurable value pertaining to the classification of an action carbon emission value 128 to an excessive carbon emission value 132. Continuing the example, an output variable may represent an excessive carbon emission value 132 specific the current user or manufacturer. In an embodiment, action carbon emission value 128 and/or excessive carbon emission value 132 may be represented by their own fuzzy set. In other embodiments, an excessive carbon emission value 132 specific to the user may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any software component datum, any source repository datum, any malicious quantifier datum, any predictive threshold datum, any string distance datum, any resource datum, any niche datum, and/or any combination of the above. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, an excessive carbon emission value 132 may indicate a sufficient degree of overlap with the action carbon emission value 128 and an example of an excessive carbon emission value 132 for combination to occur as described above. There may be multiple thresholds; for instance, a second threshold may indicate an emergency due to excessive carbon emissions. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both excessive carbon emission value 132 and action carbon emission value 128 have fuzzy sets, an action carbon emission value 128 may be classified as an excessive carbon emission value 132 by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
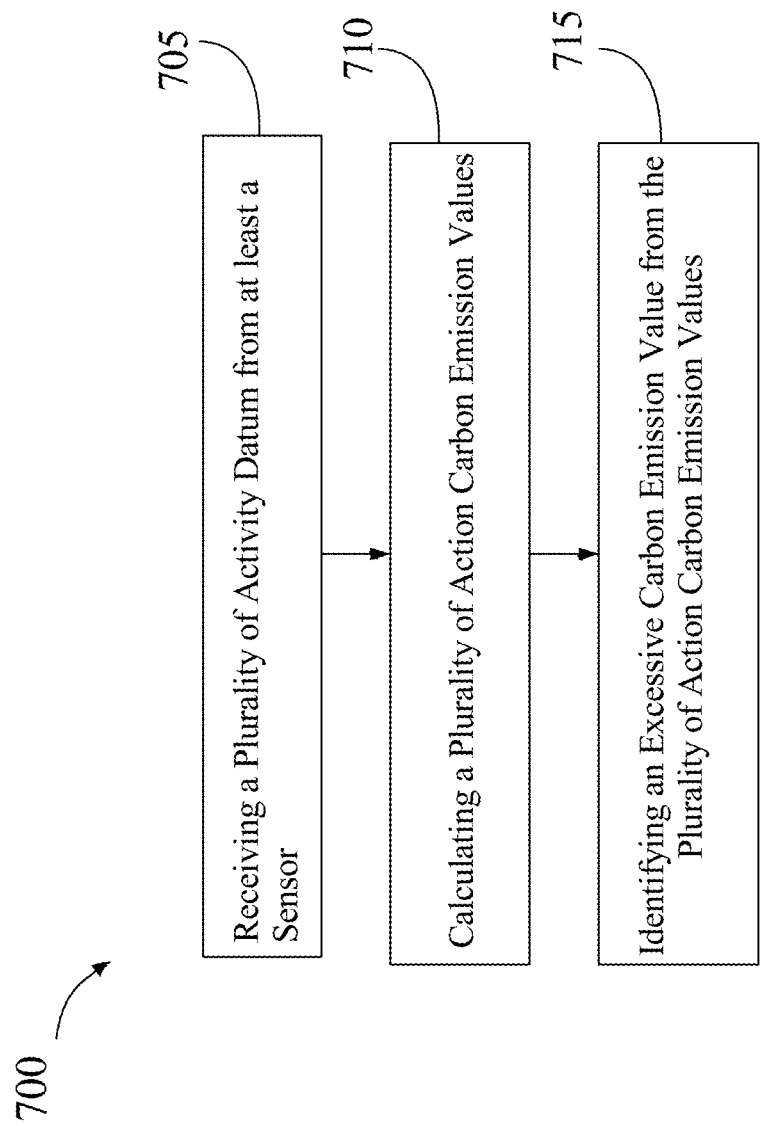
FIG. 7 is a flow diagram of an exemplary method for identifying an excessive carbon emission value.

Referring to FIG. 7, an exemplary method 700 for identifying an excessive carbon emission value is shown. Method 700 includes a step 705 of receiving, using at least a processor, a plurality of activity datum from at least a sensor. This may be implemented in accordance with FIGS. 1-6. In some embodiments, the plurality of activity datum may include transportation data. In some embodiments, the plurality of activity datum may include manufacturing data. In some embodiments, the plurality of activity datum may include operator data.

With continued reference to FIG. 7, method 700 includes a step 710 of calculating, using at least the processor, a plurality of action carbon emission values. Step 710 includes associating each of the plurality of activity datum to an action carbon emission value of the plurality of action carbon emission values. Step 710 further includes classifying each of the plurality of activity datum to an activity category of a plurality of activity categories. This may be implemented in accordance with FIGS. 1-6. In some embodiments, classifying each of the plurality of activity datum to an activity category of a plurality of activity categories may include classifying each of the plurality of activity datum to the activity category using a category classifier. This may be implemented in accordance with FIGS. 1-6. In some embodiments, calculating the plurality of action carbon emission values may be done as a function of fuel consumption data. This may be implemented in accordance with FIGS. 1-6.

With continued reference to FIG. 7, method 700 includes a step 715 of identifying, using the at least a processor, an excessive carbon emission value from the plurality of action carbon emission values. This may be implemented in accordance with FIGS. 1-6. In some embodiments, step 715 may include identifying the excessive carbon emission value as a function of a fuzzy inference set. This may be implemented in accordance with FIGS. 1-6.

With continued reference to FIG. 7, in some embodiments method 700 may include a step of generating, by the at least a processor, an action carbon emission ranking as a function of the plurality of action carbon emission values. This may be implemented in accordance with FIGS. 1-6. In some embodiments, method 700 may include a step of identifying, by the at least a processor, the excessive carbon emission value as a function of the action carbon emission ranking. This may be implemented in accordance with FIGS. 1-6. In some embodiments, method 700 may include a step of generating, by the at least a processor, an alteration plan as a function of the excessive carbon emission value. This may be implemented in accordance with FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
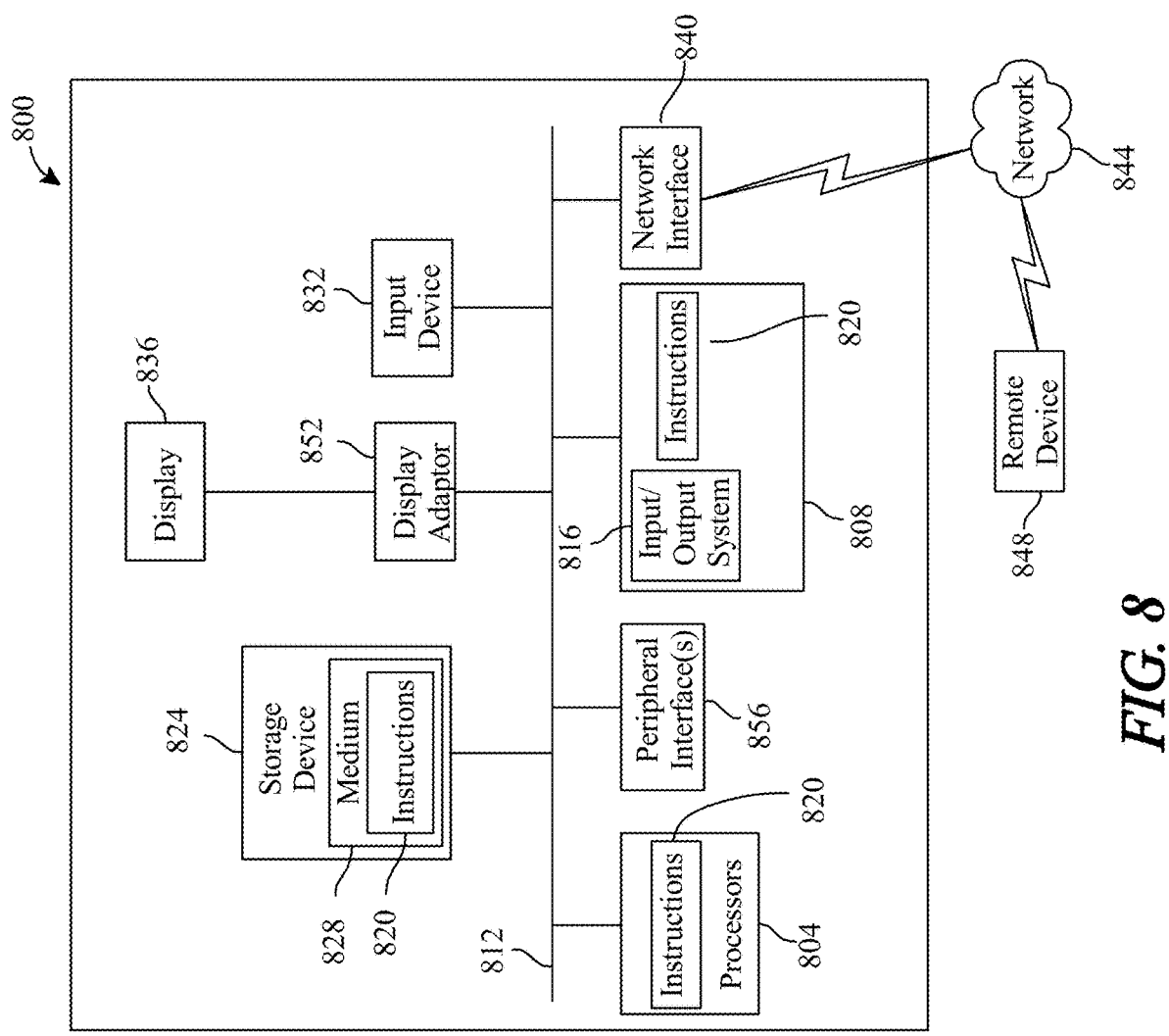
FIG. 8 is a block diagram of a computing system that can be used to implement any one or more of the methodologies disclosed herein and any one or more portions thereof

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for identifying an excessive carbon emission value, wherein the apparatus comprises:
   at least a processor;
   at least a carbon emission sensor configured to measure carbon emissions associated with a shipment on a transport vehicle; and
   a memory communicatively connected to the at least a processor, the memory containing instructions configuring the at least a processor to:
      receive a plurality of activity data from the sensor, wherein the plurality of activity data comprises at least the carbon emissions associated with the shipment and at least a transport route associated with the shipment;
      calculate a plurality of action carbon emission values as a function of the plurality of activity data, wherein calculating the plurality of action carbon emission values comprises generating an activity machine-learning model, wherein generating the activity machine-learning model further comprises:
         iteratively training the activity machine-learning model utilizing activity training data, wherein the activity training data comprises a plurality of activity data as inputs correlated to a plurality of action carbon emission values as outputs, wherein iteratively training the activity machine-learning model comprises:
            updating the activity training data as a function of the inputs and outputs of the activity training data; and
            retraining the activity training data using an updated activity training data; and
         classifying each plurality of action carbon emission output to an activity category of a plurality of activity categories;
      identify an excessive carbon emission value by calculating the highest action carbon emission value within each activity category of the plurality of activity categories; and
      generate an alteration plan for the shipment, wherein the alteration plan is configured to reduce at least the carbon emissions associated with the transport vehicle, and wherein the alteration plan comprises a reduction in the at least a transport route.

2. The apparatus of claim 1, wherein the plurality of activity data comprises manufacturing data.

3. The apparatus of claim 1, wherein the plurality of activity data comprises operator data.

4. The apparatus of claim 1, wherein classifying each of the plurality of activity data to an activity category comprises classifying each of the plurality of activity data to the activity category using a category classifier.

5. The apparatus of claim 1, wherein the memory contains instructions further configuring the at least a processor to generate an action carbon emission ranking as a function of the plurality of action carbon emission values.

6. The apparatus of claim 5, wherein the memory contains instructions further configuring the at least a processor to identify the excessive carbon emission value as a function of the action carbon emission ranking.

7. The apparatus of claim 1, wherein the plurality of action carbon emission values are calculated as a function of fuel consumption data.

8. The apparatus of claim 1, wherein the memory contains instructions further configuring the at least a processor to generate the alteration plan as a function of the excessive carbon emission value.

9. The apparatus of claim 8, wherein the alteration plan further comprises modifying one or more raw materials to reduce carbon emissions.

10. The apparatus of claim 1, wherein generating the alteration plan for the shipment comprises:
    generating one or more alteration plans for the shipment and an associated action carbon emission value for each alteration plan of the one or more alteration plans, wherein the one or more alteration plans are configured to reduce at least the carbon emissions associated with the transport vehicle;
    receiving a selection of at least one alteration plan of the one or more alteration plans through a graphical user interface as a function of a user input; and
    displaying the at least one alteration plan as a set of instructions through the graphical user interface.

11. A method for identifying an excessive carbon emission value, wherein the method comprises:
    receiving, using at least a processor and at least a carbon emission sensor configured to measure carbon emissions associated with a shipment on a transport vehicle, a plurality of activity data, wherein the plurality of activity data comprises at least the carbon emissions associated with the shipment and at least a transport route associated with the shipment,
    calculating, using at least the processor, a plurality of action carbon emission values as a function of the plurality of activity data, wherein calculating the plurality of action carbon emission values comprises generating an activity machine-learning model, wherein generating the activity machine-learning model further comprises:
       iteratively training the activity machine-learning model utilizing activity training data, wherein the activity training data comprises a plurality of activity data as inputs correlated to a plurality of action carbon emission values as outputs, wherein iteratively training the activity machine-learning model comprises:
          updating the activity training data as a function of the inputs and outputs of the activity training data; and
          retraining the activity training data using an updated activity training data; and
       classifying each plurality of action carbon emission output to an activity category of a plurality of activity categories;
    identifying, using the at least a processor, an excessive carbon emission value by calculating the highest action carbon emission value within each activity category of the plurality of activity categories; and generating, using the at least a processor, an alteration plan for the shipment, wherein the alteration plan is configured to reduce at least the carbon emissions associated with the transport vehicle, and wherein the alteration plan comprises a reduction in the at least a transport route.

12. The method of claim 11, wherein the plurality of activity data comprises manufacturing data.

13. The method of claim 11, wherein the plurality of activity data comprises operator data.

14. The method of claim 11, wherein classifying each of the plurality of activity data to an activity category comprises classifying each of the plurality of activity data to the activity category using a category classifier.

15. The method of claim 11, further comprising generating, by the at least a processor, an action carbon emission ranking as a function of the plurality of action carbon emission values.

16. The method of claim 15, further comprising identifying, by the at least a processor, the excessive carbon emission value as a function of the action carbon emission ranking.

17. The method of claim 11, wherein the plurality of action carbon emission values are calculated as a function of fuel consumption data.

18. The method of claim 11, further comprising generating, by the at least a processor, the alteration plan as a function of the excessive carbon emission value.

19. The method of claim 18, wherein generating the alteration plan further comprises modifying one or more raw materials to reduce carbon emissions.

20. The method of claim 11, wherein generating, using the at least a processor, the alteration plan for the shipment comprises:

generating one or more alteration plans for the shipment and an associated action carbon emission value for each alteration plan of the one or more alteration plans, wherein the one or more alteration plans are configured to reduce at least the carbon emissions associated with the transport vehicle;

receiving a selection of at least one alteration plan of the one or more alteration plans through a graphical user interface as a function of a user input; and displaying the at least one alteration plan as a set of instructions through the graphical user interface.

* * * * *